US012694874B2

(12) United States Patent
Su et al.

(10) Patent No.: US 12,694,874 B2
(45) Date of Patent: Jul. 28, 2026

(54) MULTILINGUAL COMMAND LINE INTERFACE BOTS ENABLED WITH A REAL-TIME LANGUAGE ANALYSIS SERVICE

(71) Applicant: International Business Machines Corporation, Armonk, NY (US)

(72) Inventors: Jun Su, Beijing (CN); Su Liu, Austin, TX (US); Peng Hui Jiang, Beijing (CN); Michael Davis, Chesterfield, MO (US)

(73) Assignee: International Business Machines Corporation, Armonk, NY (US)

( * ) Notice: Subject to any disclaimer, the term of this patent is extended or adjusted under 35 U.S.C. 154(b) by 166 days.

(21) Appl. No.: 18/533,162

(22) Filed: Dec. 7, 2023

(65) Prior Publication Data

US 2025/0191585 A1     Jun. 12, 2025

(51) Int. Cl.
| | |
|---|---|
| *G10L 15/22* | (2006.01) |
| *G06F 40/58* | (2020.01) |
| *G10L 15/00* | (2013.01) |

(52) U.S. Cl.
CPC .............. *G10L 15/22* (2013.01); *G06F 40/58* (2020.01); *G10L 15/005* (2013.01)

(58) Field of Classification Search
CPC ..... G10L 15/005; G10L 15/22; G06F 40/263; G06F 40/30
See application file for complete search history.

(56) References Cited

U.S. PATENT DOCUMENTS

| | | | | |
|---|---|---|---|---|
| 5,524,169 | A * | 6/1996 | Cohen | ..................... G10L 15/26 |
| | | | | 704/E15.044 |
| 8,942,985 | B2 | 1/2015 | Mowatt et al. | |
| 9,589,564 | B2 * | 3/2017 | Sharifi | .................... G10L 15/08 |
| 10,089,070 | B1 | 10/2018 | Kanjariya | |
| 10,229,677 | B2 * | 3/2019 | Chen | ....................... G10L 15/22 |
| 11,017,766 | B2 * | 5/2021 | Chao | ....................... G10L 13/00 |
| 2008/0208593 | A1 * | 8/2008 | Ativanichayaphong | ..................... |
| | | | | G10L 15/24 |
| | | | | 704/275 |
| 2008/0300886 | A1 | 12/2008 | Patch | |
| 2010/0169098 | A1 | 7/2010 | Patch | |
| 2011/0035219 | A1 * | 2/2011 | Kadirkamanathan | ........................ |
| | | | | G10L 15/187 |
| | | | | 707/769 |
| 2014/0358553 | A1 | 12/2014 | Helmke | |
| 2015/0364129 | A1 * | 12/2015 | Gonzalez-Dominguez | ................. |
| | | | | G10L 15/005 |
| | | | | 704/251 |
| 2021/0074295 | A1 * | 3/2021 | Moreno | ................ G10L 15/063 |
| 2024/0177710 | A1 * | 5/2024 | Kumar Saha | ........... G06F 40/30 |

FOREIGN PATENT DOCUMENTS

| | | |
|---|---|---|
| CN | 104049960 A | 9/2014 |
| CN | 111862941 A | 10/2020 |

* cited by examiner

*Primary Examiner* — Daniel Abebe
(74) *Attorney, Agent, or Firm* — CHIP LAW GROUP

(57) ABSTRACT

The input of a user is monitored and a location of the user and a language of the user are detected. The input is converted to a text string in the detected user language and the converted text string is parsed into parsed tokens. A command line and correlated parameters indicated by the input are recognized based on the parsed tokens. The recognized command line with the assigned parameters is executed.

18 Claims, 7 Drawing Sheets

500

504
Monitor speech of a user

508
Detect a language and a location of the user

512
Convert monitored speech to a text string

516
Parse text string into tokens

520
Recognize command line and correlated parameters

524
Assign variables of environment and attributes for the recognized command line 528
Deploy and execute the recognized command line with the assigned parameters 532
Validate the results from executing the recognized command line

| TIME LINE | USER ID | DEVICE ID | IP ADDRESS | USER LOCATION | APP ID | VOICE ID | VOICE CONTENT | TEXT CONTENT | DETECTED LOCALE | MAPPED CL | CL ATTRIBUTE LIST | VALIDATION STATUS |
|---|---|---|---|---|---|---|---|---|---|---|---|---|
| TIME-1 | NULL | NULL | NULL | NULL | NULL | NULL | NULL | NULL | NULL | NULL | NULL | NULL |
| TIME-2 | USER001 | D001 | x.1.1.001 | NEW YORK | APP001 | V0001 | PLEASE LIST ALL FILES IN DETAIL | NULL | NULL | NULL | NULL | NULL |
| TIME-3 | USER001 | D001 | x.1.1.001 | NEW YORK | APP001 | V0001 | PLEASE LIST ALL FILES IN DETAIL | PLEASE LIST ALL FILES IN DETAIL | EN_US.UTF-8 | IS | "-l" | VALIDATED |
| TIME-4 | USER002 | D002 | x.1.1.002 | BEIJING | APP002 | V0002 | 请详细列出所有文件 | NULL | NULL | NULL | NULL | NULL |
| TIME-5 | USER002 | D002 | x.1.1.002 | BEIJING | APP002 | V0002 | 请详细列出所有文件 | PLEASE LIST ALL FILES IN DETAIL | ZH_CN.UTF-8 | IS | "-l" | VALIDATED |
| TIME-6 | USER003 | D003 | x.1.1.003 | MOSCOW | APP003 | V0003 | ПОЖАЛУЙСТА, ПЕРЕЧИСЛИТЕ ВСЕ ФАЙЛЫ ПОДРОБНО | NULL | NULL | NULL | NULL | NULL |
| TIME-7 | USER003 | D003 | x.1.1.003 | MOSCOW | APP003 | V0003 | ПОЖАЛУЙСТА, ПЕРЕЧИСЛИТЕ ВСЕ ФАЙЛЫ ПОДРОБНО | PLEASE LIST ALL FILES IN DETAIL | RU_RU_US.UTF-8 | IS | "-l" | VALIDATED |

*FIG. 2*

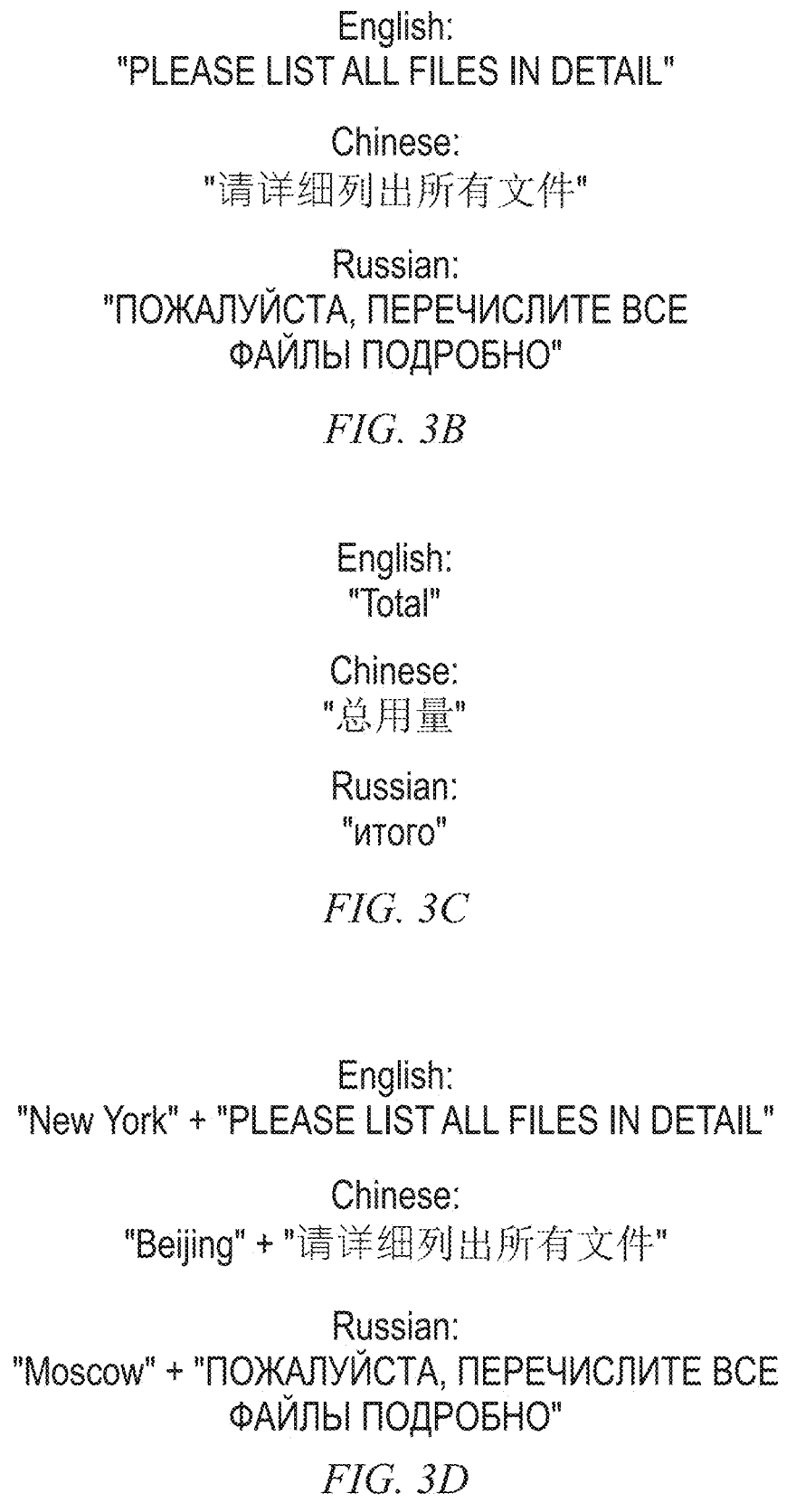

English:
"PLEASE LIST ALL FILES IN DETAIL"

Chinese:
"请详细列出所有文件"

Russian:
"ПОЖАЛУЙСТА, ПЕРЕЧИСЛИТЕ ВСЕ
ФАЙЛЫ ПОДРОБНО"

*FIG. 3B*

English:
"Total"

Chinese:
"总用量"

Russian:
"итого"

*FIG. 3C*

English:
"New York" + "PLEASE LIST ALL FILES IN DETAIL"

Chinese:
"Beijing" + "请详细列出所有文件"

Russian:
"Moscow" + "ПОЖАЛУЙСТА, ПЕРЕЧИСЛИТЕ ВСЕ
ФАЙЛЫ ПОДРОБНО"

*FIG. 3D*

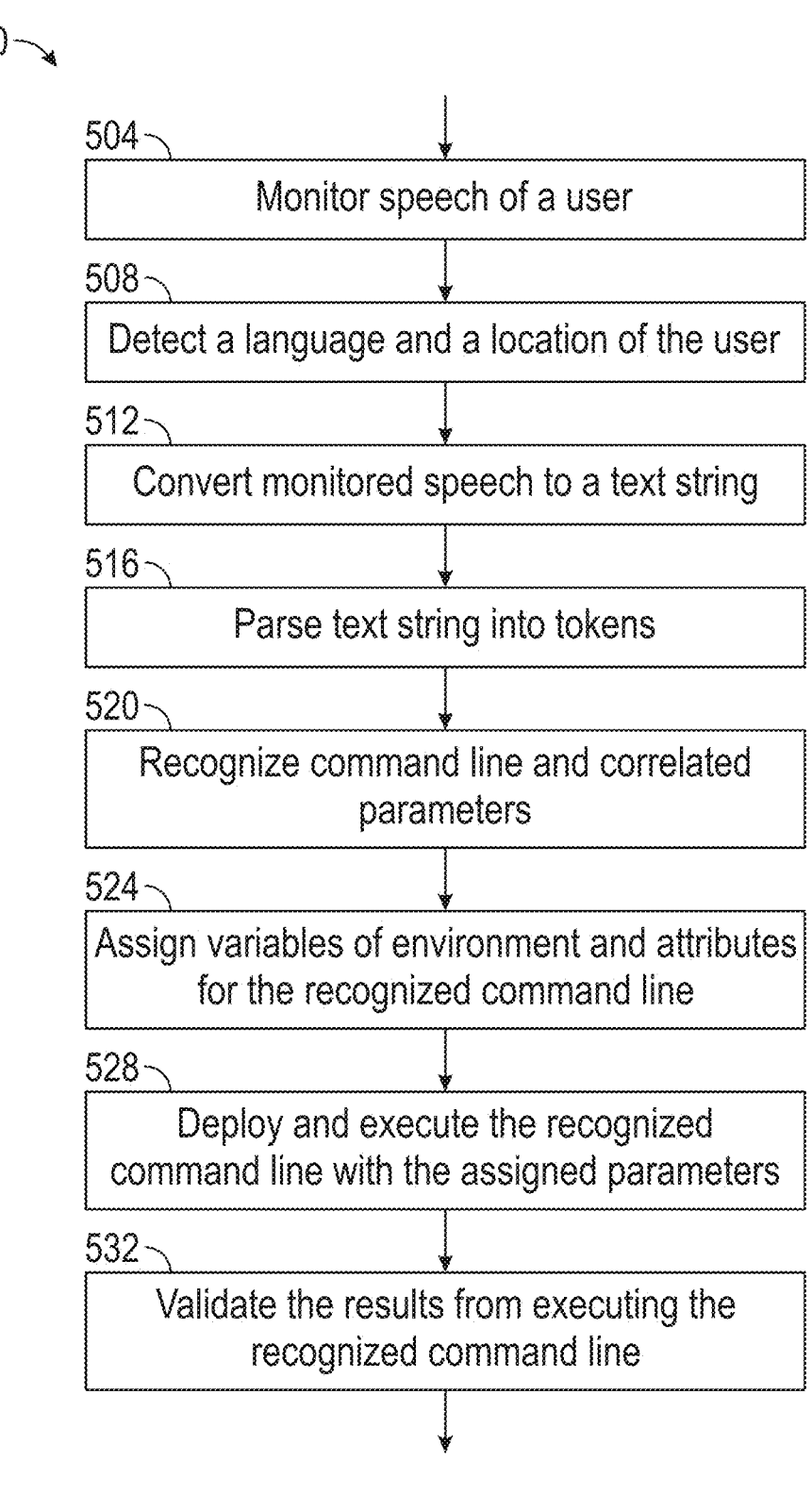

500

504 — Monitor speech of a user

508 — Detect a language and a location of the user

512 — Convert monitored speech to a text string

516 — Parse text string into tokens

520 — Recognize command line and correlated parameters

524 — Assign variables of environment and attributes for the recognized command line 528 — Deploy and execute the recognized command line with the assigned parameters 532 — Validate the results from executing the recognized command line

*FIG. 5*

MULTILINGUAL COMMAND LINE INTERFACE BOTS ENABLED WITH A REAL-TIME LANGUAGE ANALYSIS SERVICE

BACKGROUND

The present invention relates generally to the electrical, electronic and computer arts and, more particularly, to computer systems and human-computer interfaces.

A command line interface is a way to interact with a computer where lines of text (a command line) are input into the computer system. Command Line Interfaces (CLI) are quite pertinent in, for example, modern operating systems, applications, and the like. Especially on a cloud computing environment, graphical user interface (GUI) buttons and links may directly or indirectly be associated with one or more CLIs. Many modern applications understand human voice commands by converting them into correlated CLIs, using aspects such as voice-to-CLI, voice-to-CLI feature, and the like, and then executing the command lines.

Traditional CLIs, however, pose limitations for users who are more comfortable expressing themselves through spoken language or who have language preferences that differ from the default settings of the system. For example, conventional voice-to-CLI (also known as Voice2CLI) feature(s) cannot understand the language/locale corresponding to each received voice command. (As used herein, a locale is a computer software locale, defined, for example, as a set of parameters that defines a language of a user, a region of a user and/or preferences for a computer interface for the user.) While voice commands can be recognized and executed in multilingual and international environments, user interfaces conventionally do not seamlessly handle voice commands in different languages (voice and speech are used interchangeably herein).

BRIEF SUMMARY

Principles of the invention provide techniques for multilingual command line interface bots enabled with a real-time language analysis service. In one aspect, an exemplary method includes the operations of monitoring, using at least one hardware processor, input of a user; detecting, using the at least one hardware processor, a location of the user and a language of the user; converting, using the at least one hardware processor, the input to a text string in the detected user language; parsing, using the at least one hardware processor, the converted text string into parsed tokens; recognizing, using the at least one hardware processor, a command line and correlated parameters indicated by the input based on the parsed tokens; and executing the recognized command line with the assigned parameters.

In one aspect, a computer program product comprises one or more tangible computer-readable storage media and program instructions stored on at least one of the one or more tangible computer-readable storage media, the program instructions executable by a processor, the program instructions comprising monitoring, using at least one hardware processor, input of a user; detecting, using the at least one hardware processor, a location of the user and a language of the user; converting, using the at least one hardware processor, the input to a text string in the detected user language; parsing, using the at least one hardware processor, the converted text string into parsed tokens; recognizing, using the at least one hardware processor, a command line and correlated parameters indicated by the input based on the parsed tokens; and executing the recognized command line with the assigned parameters.

In one aspect, an apparatus comprises a memory and at least one processor, coupled to the memory, and operative to perform operations comprising monitoring, using at least one hardware processor, input of a user; detecting, using the at least one hardware processor, a location of the user and a language of the user; converting, using the at least one hardware processor, the input to a text string in the detected user language; parsing, using the at least one hardware processor, the converted text string into parsed tokens; recognizing, using the at least one hardware processor, a command line and correlated parameters indicated by the input based on the parsed tokens; and executing the recognized command line with the assigned parameters.

In one example embodiment, results of executing the recognized command line are verified to validate that the recognized command line is an accurate conversion of the input.

In one example embodiment, the converting of the input to the text string further comprises performing speech recognition on the input.

In one example embodiment, a framework of a Multilingual Command Line Interface Bot for supporting an intelligent voice control command line interface across different languages is defined.

In one example embodiment, mappings of the human command to command line mapping repository are updated based on results of the verifying operation.

In one example embodiment, the monitoring, detecting, converting, parsing, recognizing, and executing operations are repeated based on additional input, wherein the executing operation further comprises controlling a computer resource based on the additional input.

As used herein, "facilitating" an action includes performing the action, making the action easier, helping to carry the action out, or causing the action to be performed. Thus, by way of example and not limitation, instructions executing on a processor might facilitate an action carried out by instructions executing on a remote processor, by sending appropriate data or commands to cause or aid the action to be performed. Where an actor facilitates an action by other than performing the action, the action is nevertheless performed by some entity or combination of entities.

Techniques as disclosed herein can provide substantial beneficial technical effects. Some embodiments may not have these potential advantages and these potential advantages are not necessarily required of all embodiments. By way of example only and without limitation, one or more embodiments may provide one or more of:

improvements to the technical field of computer interfaces by enabling users to interact with a command line interface using voice and/or text (such as prose) commands, which aligns with natural human communication patterns and provides an intuitive way to control and manage computer systems;

multilingual support that enables users to communicate commands in their preferred languages, regardless of their language proficiencies or locations, enhancing inclusivity and accommodating diverse user needs in multilingual environments;

increased efficiency and productivity by enabling voice-controlled interaction with computer systems, reducing the cognitive load associated with manual typing and navigation in command line interfaces (users can perform system management tasks more efficiently, leading to increased productivity and faster execution of commands);

providing accessibility and inclusivity by providing a voice-based and/or text-based (prose-based) interaction capability where the system improves accessibility for individuals with physical disabilities and those who prefer voice input over traditional text-based interfaces;

streamlined workflow: voice-controlled commands eliminate the need for manual typing and reduce the time required to perform certain tasks (users can streamline their workflows by directly expressing their commands through voice, improving efficiency and reducing repetitive actions);

language flexibility for computer interfaces by converting voice and/or text commands into the appropriate command line commands with the correct language settings and environment variables, offering flexibility in language preferences (users can seamlessly switch between languages and operate in their desired linguistic contexts);

reduced learning curve: voice and/or prose-based interaction with the command line interface can lower the learning curve for novice users or those unfamiliar with complex command line syntax, where the system bridges the gap between technical expertise and user-friendly interaction, making it easier for users to perform system management tasks; and integration with existing systems: the multilingual voice-controlled CLI can be integrated with existing command line interfaces and systems without major modifications, enabling organizations to leverage their current infrastructures while enhancing such infrastructures with voice-controlled capabilities, minimizing disruption and ensuring compatibility.

These and other features and advantages will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein:

FIG. 2 illustrates an example data structure, in accordance with example embodiments;

FIG. 3B illustrates examples of translating the same sentence spoken in different languages to the text: "Please list all files in detail," in accordance with example embodiments;

FIG. 3C illustrates examples of translating the same word spoken in different languages to the text: "Total," in accordance with example embodiments;

FIG. 3D illustrates examples that can be sent to the server for converting to a command line, in accordance with example embodiments;

FIG. 5 is a flowchart for an example Multilingual Command Line Interface Bot (MCLIB), in accordance with an example embodiment.

Figure 1:
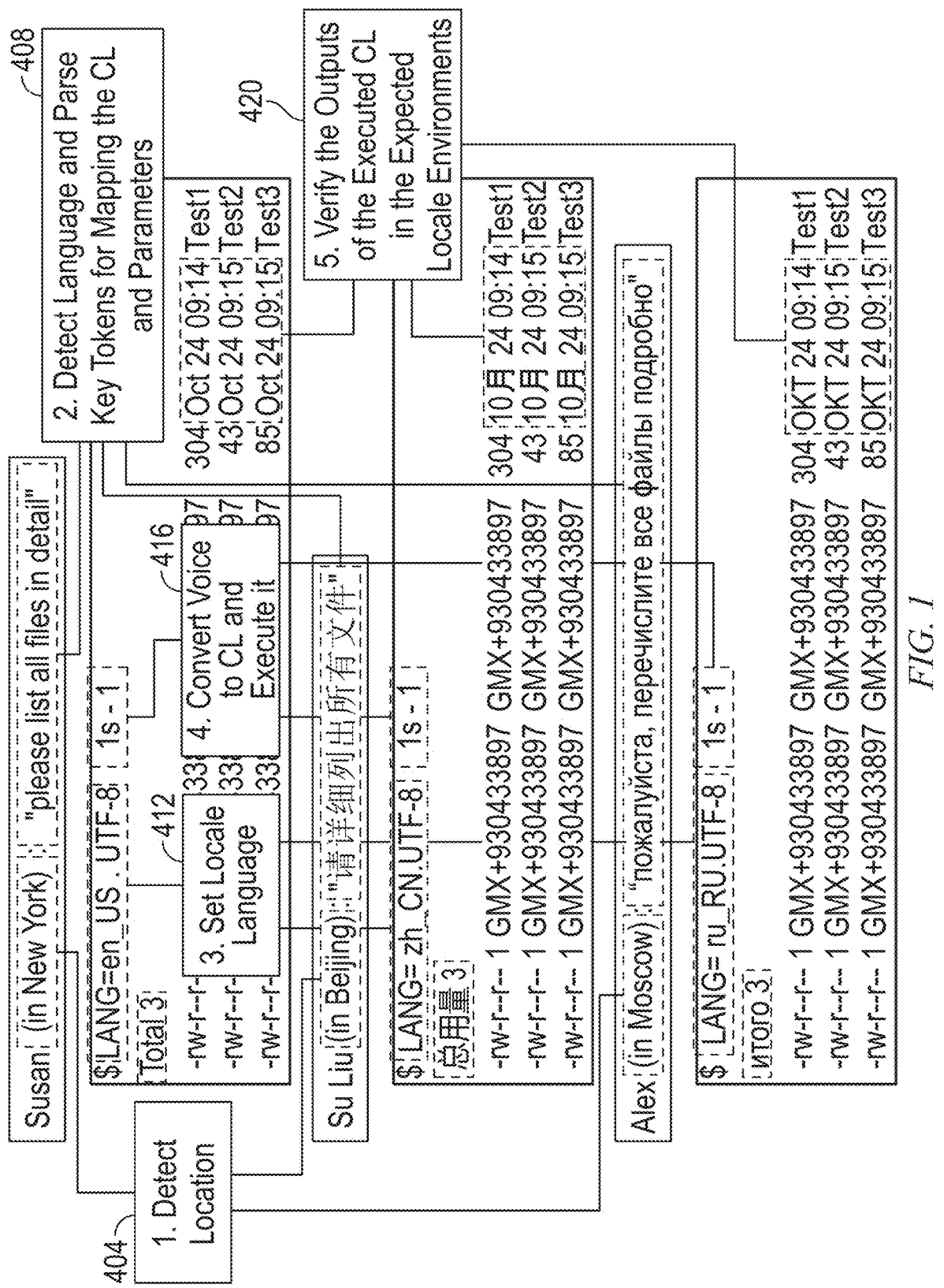
FIG. 1 illustrates the results of generating command lines from speech commands, in accordance with example embodiments.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of inventions described herein will be in the context of illustrative embodiments. Moreover, it will become apparent to those skilled in the art given the teachings herein that numerous modifications can be made to the embodiments shown that are within the scope of the claims. That is, no limitations with respect to the embodiments shown and described herein are intended or should be inferred.

In general terms, an exemplary method, according to an aspect of the invention (reference numbers are described below), includes the operations of monitoring, using at least one hardware processor, input of a user (operation 504; monitor 248); detecting, using the at least one hardware processor, a location of the user and a language of the user (operation 508; locale detector 236); converting, using the at least one hardware processor, the input to a text string in the detected user language (operation 512; speech-to-text agent 268); parsing, using the at least one hardware processor, the converted text string into parsed tokens (operation 516; parser 288); recognizing, using the at least one hardware processor, a command line and correlated parameters indicated by the input based on the parsed tokens (operation 520; recognizer 240); and executing the recognized command line with the assigned parameters (operation 528; deployment agent 252). This provides the technical effect/advantage of providing a method for generating a command line from written prose text or spoken text.

In one aspect, a computer program product comprises one or more tangible computer-readable storage media and program instructions stored on at least one of the one or more tangible computer-readable storage media, the program instructions executable by a processor, the program instructions comprising monitoring, using at least one hardware processor, input of a user (operation 504; monitor 248); detecting, using the at least one hardware processor, a location of the user and a language of the user (operation 508; locale detector 236); converting, using the at least one hardware processor, the input to a text string in the detected user language (operation 512; speech-to-text agent 268); parsing, using the at least one hardware processor, the converted text string into parsed tokens (operation 516; parser 288); recognizing, using the at least one hardware processor, a command line and correlated parameters indicated by the input based on the parsed tokens (operation 520; recognizer 240); and executing the recognized command line with the assigned parameters (operation 528; deployment agent 252). This provides the technical effect/advantage of providing a software product for generating a command line from written prose text or spoken text.

In one aspect, a system comprises a memory and at least one processor, coupled to the memory, and operative to perform operations comprising monitoring, using at least one hardware processor, input of a user (operation 504;

monitor 248); detecting, using the at least one hardware processor, a location of the user and a language of the user (operation 508; locale detector 236); converting, using the at least one hardware processor, the input to a text string in the detected user language (operation 512; speech-to-text agent 268); parsing, using the at least one hardware processor, the converted text string into parsed tokens (operation 516; parser 288); recognizing, using the at least one hardware processor, a command line and correlated parameters indicated by the input based on the parsed tokens (operation 520; recognizer 240); and executing the recognized command line with the assigned parameters (operation 528; deployment agent 252). This provides the technical effect/advantage of providing a system for generating a command line from written prose text or spoken text.

In one example embodiment, one or more variables of environment and attributes for the recognized command line and the correlated parameters are assigned (operation 524; assigner 272). This provides the technical effect/advantage of ensuring that the device executing the recognized command line has the appropriate detailed locale setting information, such as the language of the user, to properly execute the recognized command line.

In one example embodiment, the assigning operation assigns a language of the user, a date format of the user, and a location of the user. This provides the technical effect/advantage of ensuring that the device executing the recognized command line has the setting information needed to properly execute the recognized command line with the appropriate language and date format of the user.

In one example embodiment, results of executing the recognized command line are verified to validate that the recognized command line is an accurate conversion of the input (operation 532; validator 276). This provides the technical effect/advantage of detecting an inaccurate recognition of the text string and improvements to the accuracy of the command line recognition process.

In one example embodiment, the converting of the input to the text string further comprises performing speech recognition on the input. This provides the technical effect/advantage of enabling the conversion of speech to a command line (in addition to the conversion of prose text to a command line.

In one example embodiment, the user is enabled to configure settings and criteria of the method (manager, service profile 256, data structure 280, user profiles 260, criteria 284); a human command to command line mapping repository is learned and generated for one or more languages (learner 232, mapping repository 264); and the settings and criteria are adjusted based on a result of the validation (adjuster 244). This provides the technical effect/advantage of improving the accuracy of the recognition of the command line by learning from inaccurate command line conversions.

In one example embodiment, a framework of a Multilingual Command Line Interface Bot for supporting an intelligent voice control command line interface across different languages is defined (server 220, client 224). This provides the technical effect/advantage of providing a platform for a Bot that is capable of generating a command line from written prose text or spoken text.

In one example embodiment, a data structure with related algorithms for tracking user voice commands and related parameters is defined (data structure 280). This provides the technical effect/advantage of maintaining, for example, user related data that is instrumental to providing customized command line generation from written text and spoken text, such as command lines that are compatible with the user's operating system.

In one example embodiment, the different elements are one or more of time, location, event, subject, verb and object. This provides the technical effect/advantage of improving the accuracy of the command line conversion by providing additional information for the text that is input into the recognizer 240.

In one example embodiment, mappings of the human command to command line mapping repository are updated based on results of the verifying operation (learner 232, mapping repository 264). This provides the technical effect/advantage of improving the accuracy of the command line conversion by revising the mappings in the mapping repository 264 for use by the recognizer 240.

In one example embodiment, the monitoring, detecting, converting, parsing, recognizing, and executing operations are repeated based on additional input, wherein the executing operation further comprises controlling a computer resource based on the additional input. This provides the technical effect/advantage of controlling a computer resource via written prose text or spoken text.

Generally, one or more embodiments provide a Multilingual Command Line Interface Bot (MCLIB) that enables users to interact with a command line interface (CLI) using voice commands in multiple languages. References herein to a "Multilingual Command Line Interface Bot" and/or "MCLIB" should be understood as references to an exemplary embodiment and any features described in connection therewith are not necessarily required in every embodiment. By leveraging automatic speech recognition (ASR), natural language processing (NLP), and command line execution capabilities, an exemplary MCLIB system provides a seamless and efficient method of controlling and managing computer systems and software across different languages. Through robust language detection, command parsing, and execution, users can effortlessly communicate their intentions, while the MCLIB system accurately converts voice commands into the appropriate command line commands with the appropriate environment variables and parameters.

It should be noted that exemplary aspects of the invention relate to translation and accordingly the text and figures include examples of the Russian language using the Cyrillic alphabet and examples of the Chinese language using simplified Chinese characters.

Applications and other entities that execute commands need to understand the current locale first during the launching stage. Without the appropriate locale setting, the outputs expected by the user, such as messages of usage, status, errors and the like, may not be displayed properly.

Problems and Challenges

Command Line Interfaces (CLI) are quite pertinent in, for example, modern operating systems. Traditional CLIs pose limitations for users who are more comfortable expressing themselves through spoken language or who have language preferences that differ from the default settings of the system. Generally, a voice command can be recognized and executed; for example, an operating system command may include a file search command that can be activated through an audio command interface. In one example embodiment, a unified interface is provided that can seamlessly handle voice commands in different languages for multilingual and international environments.

The CLI execution environment is configured for a corresponding language and locale based on an identified user's location and spoken language. For instance, if Susan is speaking English, the system language of CLI is set for English, e.g. "en." If Susan is in New York, the location and region of the system for the CLI is set as "US." Therefore, the locale setting of Susan's CLI shall be set as "en_US." If the default character set and codepage is an eight-bit Unicode Transformation Format (UTF-8) in Susan's CLI application, then the CLI locale setting for Susan shall be "en_US.UTF-8." _Based on the example of FIG. 1, the "ls-1" CLI for Susan shall be executed under the "en_US.UTF-8" locale environment, and all output results are displayed 1) in English, 2) with the conventional MM/DD/YEAR format of the United States and 3) in UTF-8 encoding. Similar configurations are established for the Chinese and Russian cases.

Understanding and executing voice commands and related environment variables across languages, accommodating user preferences, and enabling efficient system management in an operated multilingual system or device is quite challenging. Advantageously, one or more embodiments overcome prior art challenges and support a Multilingual Command Line Interface Bot as software as a service (SaaS), leveraging and integrating automatic speech recognition (ASR) for understanding multilingual CLI voice requests, intelligently parsing and mapping voice commands to the appropriate CLI command with the appropriate environment variables and proper parameters in different languages, crossing language barriers and enabling a more natural, user-friendly human computer interaction (HCI) with the CLI and empowering users to control their systems effectively, irrespective of their language proficiency or location.

In one example embodiment, a unified interface that can seamlessly handle voice commands in different languages for multilingual and international environments is disclosed. In one example embodiment, an exemplary Multilingual Command Line Interface Bot (MCLIB) is enabled with a real-time language analysis service for understanding, converting, and executing a voice command line across different languages. Exemplary embodiments of the methods and/or systems include:

defining a framework of the Multilingual Command Line Interface Bot for supporting intelligent voice control command line interface across different languages, including a server and a client;

defining a special data structure, MCLIB_Data, with related algorithms for tracking user voice commands and related parameters, the data including UserID, DeviceID, IPAddress, UserLocation, AppID, VoiceID, VoiceContent, TextContent, DetectedLocale, MappedCL, CLAttributeList, ValidationStatus;

enabling users to configure settings and criteria (UserID, authentication credentials, controlled devices (IP address) and applications, set of CLs, supported languages, restrictions, etc. via a manager, a service profile, the Data Structure, user profiles and criteria, described more fully below);

learning and generating human command to CLI mapping repositories for different languages via a learner and a mapping repository, described more fully below;

monitoring user speech using a monitor, described more fully below;

detecting a location and language of a user via a locale detector, described more fully below;

converting the user voice to a text string in the detected language via a speech-to-text agent, described more fully below;

parsing the converted text string into different elements (time, location, event, subject, verb, object and the like) via a parser, described more fully below;

recognizing a command line and correlated parameters according to parsed tokens via a recognizer, described more fully below;

assigning the variables of environment and attributes of the recognized command line and parameters via an assigner, described more fully below;

deploying and executing, using a deployment agent, the recognized CL with the assigned parameters (options, flags), described more fully below;

validating, using a validator, the returned results to make sure the CL has been converted and executed properly (discussed below);

adjusting, using an adjuster, the criteria and related settings according to the validation result (discussed below); and updating, using a learner, the mapping(s) in the mapping repository 264 (discussed below) using the adjustments provided by the adjuster 244 (discussed below).

Executing Voice CL in Different Languages

FIG. 1 illustrates the results of generating command lines from speech commands, in accordance with example embodiments. In one example embodiment, a location of the user is detected (step 404). The language of the user is detected and the speech is converted to text by analyzing the speech spoken by the user; key tokens for mapping the converted text to a CL and corresponding parameters are parsed from the analyzed speech (step 408). The locale is set (step 412). The text corresponding to the speech is converted to a command line and the command line is executed (step 416). The outputs of the executed CL in the expected locale environment are verified (step 420).

Data Changes in Voice CL Conversion

FIG. 2 illustrates an example data structure, in accordance with example embodiments. As described below, the data structure holds data related to relationship algorithms. The data includes a UserID, DeviceID, IPAddress, UserLocation, AppID, VoiceID, VoiceContent, TextContent, DetectedLocale, MappedCL, CLAttributeList, and ValidationStatus. As illustrated in FIG. 2, lines Time-2 and Time-3 correspond to an English-language user, lines Time-4 and Time-5 correspond to a Chinese-language user and lines Time-6 and Time-7 correspond to a Russian-language user.

Figure 3A:
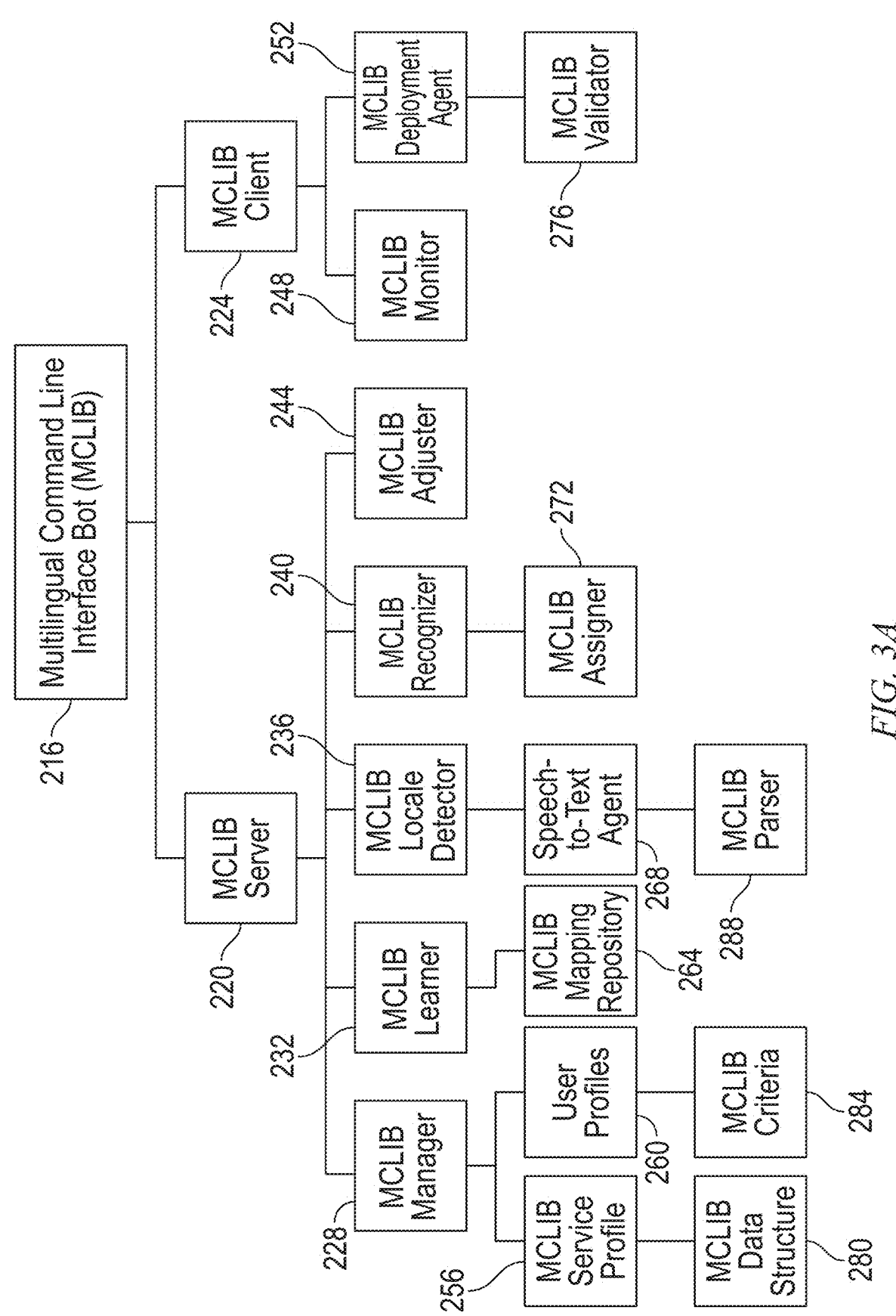
FIG. 3A is a block diagram showing key components of an example Multilingual Command Line Interface Bot (MCLIB), in accordance with an example embodiment.

FIG. 3A is a block diagram showing key components of an example Multilingual Command Line Interface Bot (MCLIB) 216, in accordance with an example embodiment. In one example embodiment, a server application (Server) 220 receives client voice command requests from client 224, determines the corresponding command and correlated parameters, and generates and returns a computer understandable CL to the client 224. In one example embodiment, the client voice command requests are received in multiple languages.

A user interface (manager) 228 enables users to configure related settings and criteria, including user profiles 260, a user identifier (UserID), authentication credentials, controlled devices (such as an IP address) and applications, a set of CLs, supported languages, restrictions, and the like. A configuration file (service profile) 256 saves the configured settings. A data structure 280 holds related data based on relationship algorithms, including MCLIB_Data (UserID, DeviceID, AppID, UserLocation, IPAddress, VoiceID, VoiceContent, TextContent, DetectedLocale, MappedCL, CLAttributeList, ValidationStatus).

A set of rules (criteria) 284 is used for defining a service, including, for example, the UserID, authentication credentials, controlled devices (such as IP address) and applications, a set of CLs, supported languages, restrictions and the like. The criteria may be customized by users for meeting personal preferences, needs and the like.

A locale detector 236 detects a location and a language of a user. For instance, as described above, if Susan is speaking English, the system language of CLI is configured for English, e.g. "en." If Susan is in New York, the location and region of the system of CLI is set as "US." Therefore, the locale setting of Susan's CLI is set as "en_US." If the default character set and codepage is UTF-8 in Susan's CLI application, then the CLI locale setting for Susan shall be "en_US.UTF-8." The output results are displayed 1) with "Total (File Size)" in English, 2) with the conventional MM/DD/YEAR format of the United States and 3) in UTF-8 encoding (which can be displayed without any problems on any UTF-8 platforms). Similar configurations are established for the Chinese and Russian cases. Thus, the locale detector 236 can detect locale type based on a user's location and speaking language: "New York": en_US.UTF-8; "Beijing": zh_CN.UTF-8; "Moscow": ru_RU.UTF-8.

A speech-to-text agent 268 converts user speech to a text string in the detected language. FIG. 3B illustrates examples of translating the same sentence spoken in different languages to the text: "Please list all files in detail," in accordance with example embodiments.

A parser 288 converts a text string into different elements (time, location, event, subject, verb, object and the like). For instance, parser 288 can convert the text "please list all files in detail" into basic CL elements (token): "list," "all," "files," "in details." In one example embodiment, the parser 288 is implemented using a conventional parser program of a natural language processor.

A recognizer 240 maps the parsed tokens to a command line and correlated parameters. For instance, the recognizer 240 can recognize "list"+"files" as a CL "ls" and "all," and "in details" as parameter "-1."

An assigner 272 assigns the variables of the environment and the attributes of the recognized command line and parameters. Applications and other entities that execute commands should be able to understand the current locale first during, for example, the launching stage. Without the appropriate locale settings, the user expected outputs (such as messages related to usages, status, errors and the like) may not be properly displayed. For instance, the assigner 272 can assign the detected environment variables "en_US.UTF-8", "zh_CN.UTF-8"; and "ru_RU.UTF-8" to recognized CL "ls-1", respectively, so the users can receive the expected outputs within the appropriate scripts and the appropriate cultural formats:

$$LANG = en\_US.UTF-8 ls-1$$
$$LANG = zh\_CN.UTF-8 ls-1$$
$$LANG = ru\_RU.UTF-8 ls-1.$$

It is noted that "LANG=en_US.UTF-8 ls-1" means the recognized command "ls-1" will be executed under the "en_US.UTF-8" locale environment, and the expected output results will be displayed 1) in English, 2) with U.S. cultural conventions (such as the MM/DD/YEAR format for the date) and 3) in the UTF-8 encoding. "LANG=zh_CN.UTF-8 ls-1" means the recognized command "ls-1" will be executed under the "zh_CN.UTF-8" locale environment, and the expected output results will be displayed 1) in simplified Chinese, 2) with Chinese cultural conventions (such as the YEAR/MM/DD format for the date) and 3) in UTF-8 encoding. "LANG=ru_RU.UTF-8 ls-1" means the recognized command "ls-1" will be executed under the "ru_RU.UTF-8" locale environment, and the expected output results will be displayed 1) in simplified Russian/Cyrillic, 2) with Russian cultural conventions (such as the DD/MM/YEAR format for the date) and 3) in UTF-8 encoding.

The validator 276 validates the results returned by executing the CL to ensure that the CL has been converted and executed properly. If the CL has not been converted and executed properly, the validator 276 sends an error report to the client 224 and the server 220. FIG. 3C illustrates examples of translating the same word spoken in different languages to the text: "Total," in accordance with example embodiments. For instance, the program integrated information (PII) message "Total" in the returned "ls-1" CL is translated into the equivalent Chinese phrase in zh_CN.UTF-8 and in ru_RU.UTF-8, respectively, as illustrated in FIG. 3C. Otherwise, the validator 276 returns an indication of an error to both the user and the server 220.

An adjuster 244 adjusts the MCLIB criteria 284 and related settings according to results generated by the validator 276. For instance, if the validator 276 returns errors (such as the error that the term "Total" generated by the "ls-1" CL was not translated into the proper written text in zh_CN.UTF-8 and ru_RU.UTF-8, as illustrated in FIG. 3C), then the adjuster 244 shall take action to check and adjust related components, settings, and configurations.

A client 224 is a plugin and/or application which can be installed in an application or at an application level for detecting and correcting context and logic errors in real-time, improving the accuracy and clarity of the text.

A monitor 248 monitors user speech in different locales and language environments, and sends the speech to the server 220. FIG. 3D illustrates examples that can be sent to the server 220 for converting to a CL, in accordance with example embodiments. Thus, in one or more embodiments, the locale detector and speech recognizer are on the server, and the locale and text string are sent to the server, as described.

Figure 6:
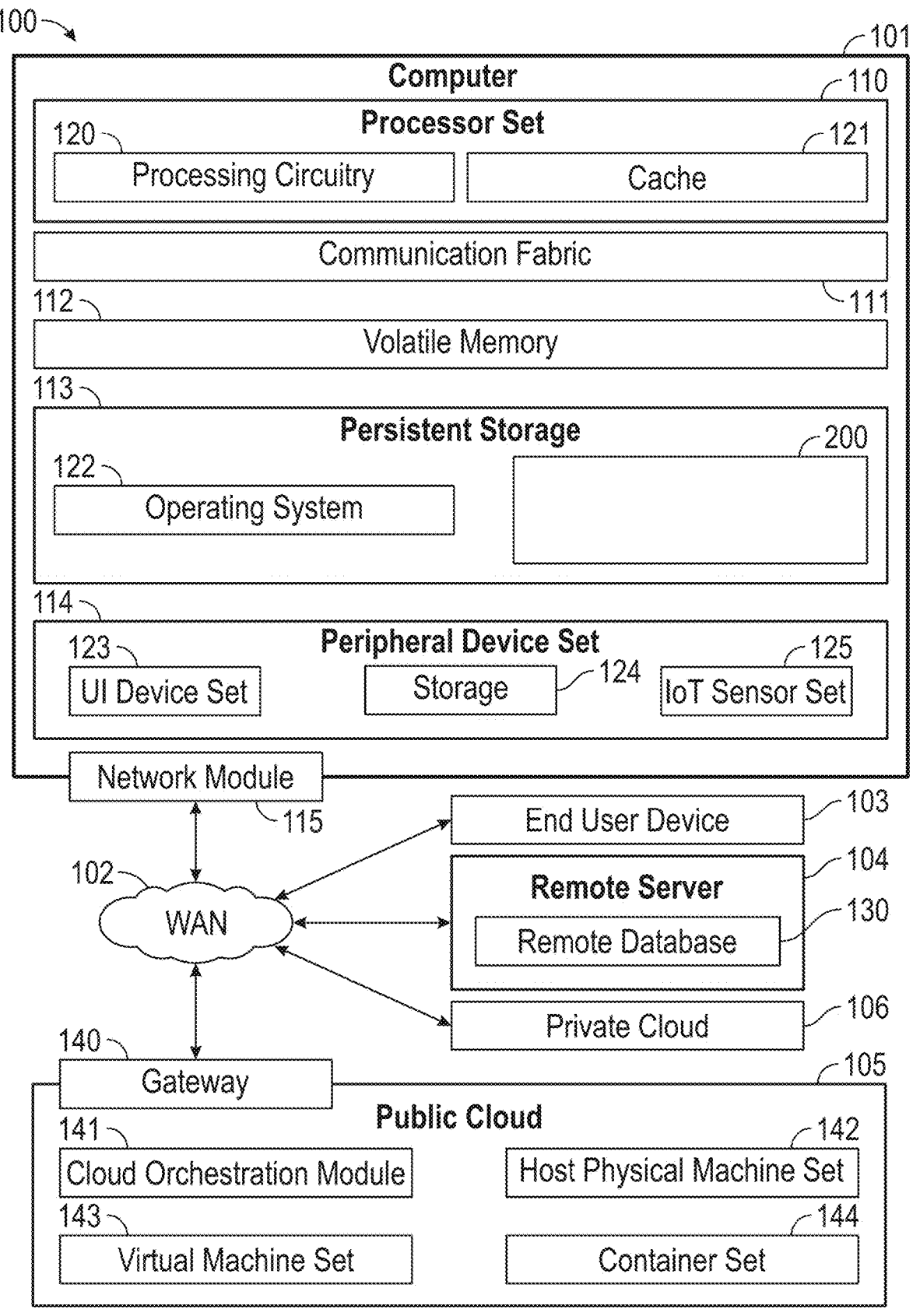
FIG. 6 depicts a computing environment according to an embodiment of the present invention.

It is worth noting that the server 220 can be, for example, a stand-alone computer (on-premise) server system, centralized cloud server system (off-premise), distributed cloud system, edging system, embedded within client system as one of hardware, software components/modules, and the like. FIG. 6 below and accompanying text describe non-limiting exemplary aspects of an exemplary server.

A deployment agent 252 receives a recognized CL from the server 220, and deploys and executes the recognized CL with the assigned parameters (options, flags). For instance, the following returned CLs are examples that can be executed on each client 224, separately:

$$LANG = en\_US.UTF-8 ls-1$$
$$LANG = zh\_CN.UTF-8 ls-1$$
$$LANG = ru\_RU.UTF-8 ls-1$$

The learner 232 uses adjustments provided by the adjuster 244 to update the recognized speech to command line mapping(s) stored in the mapping repository 264. For example, if an operating system of the client 224 does not support a specified language, the learner 232 learns the supported languages the client 224 via the adjuster 244.

Figure 4:
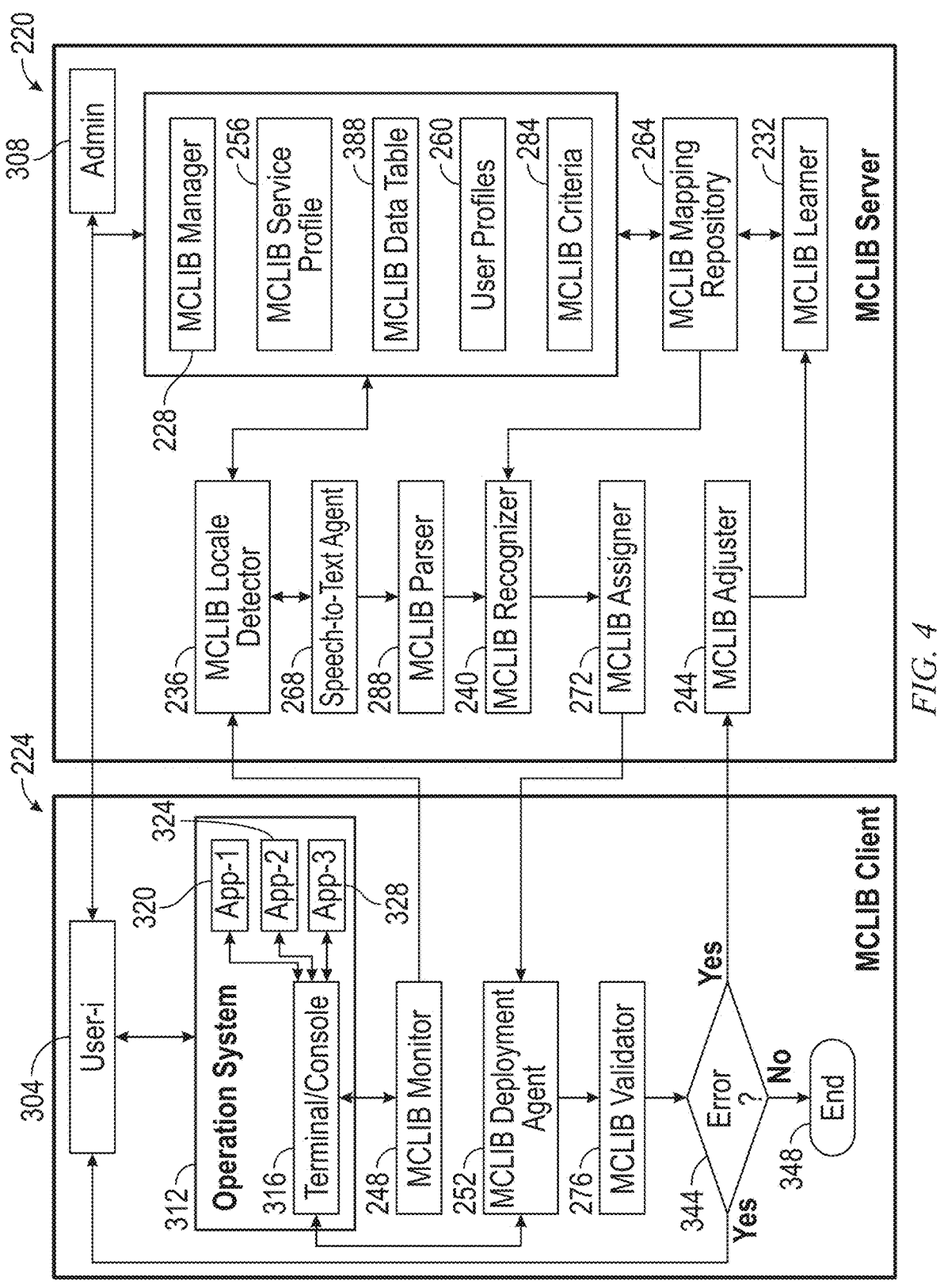
FIG. 4 is a workflow for an example Multilingual Command Line Interface Bot (MCLIB), in accordance with an example embodiment.

FIG. 4 is a workflow for an example Multilingual Command Line Interface Bot (MCLIB), in accordance with an example embodiment. In one example embodiment, a user 304 provides speech and/or text commands via a terminal/ console 316 to, for example, applications 320, 324, 328 of the client 224 running on an operating system 312. The monitor 248 monitors the user speech/text in different locales and language environments, and sends the captured speech/text along with context information that identifies the locales and language environments of the user 304 to the server 220. The locale detector 236 detects a user location and language based on the locales and language information (such as the time zone of the user 304, the language of the user interfaces and the like) and informs the speech-to-text agent 268 of the language of the user speech. The speech-to-text agent 268 converts the user speech to text strings that are forwarded to the parser 288. In one example embodiment, the speech-to-text agent 268 is implemented using a conventional speech-to-text application. (It is noted that if text (such as prose) is captured by the monitor 248, then the speech-to-text agent 268 will simply forward the text to the parser 288.) The text recognized by the speech-to-text agent 268 is parsed by the parser 288, which converts the text string into different elements (tokens), such as time, location, event, subject, verb, object and the like. The recognizer 240 processes the parsed tokens to generate a corresponding command line and correlated parameters based on the mappings in the mapping repository 264. In one example embodiment, the recognizer 240 produces a summary of the parsed text using a conventional summarizer (such as a transformer-based summarizer) and compares the summary to the entries of the mapping repository 264 to identify the most similar command line using, for example, an edit distance algorithm. In one example embodiment, the mapping repository 264 is manually initialized with a set of available command lines and machine learning is then used to update the mapping repository 264 as user speech and/or text is processed by the MCLIB system.

In one example embodiment, the assigner 272 assigns a recognized command line with the corresponding parameters, variables of the environment and attributes of the recognized command line to the deployment agent 252. For example, "LANG=en_US.UTF-8" is an important environmental variable for defining language related settings (such as language, region, character set/codepage encoding and the like) for applications and commands. In one example embodiment, the variable of language/locale name includes the following basic attributes: language tag: en, zh, ru and the like; region tag: US, CN, RU and the like; and character set/codepage: UTF-8, UTF-16, ISO8859-1, GB18030, and the like.

The deployment agent 252 receives a recognized CL from the server 220 and deploys and executes the recognized CL with the assigned parameters, such as options, flags and the like. The validator 276 is configured to, for example, use predefined rules to determine whether a result is valid. The validator 276 validates the results returned by the executed CL. For example, a check 344 is performed to determine if the client 224 was able to properly interpret the command line and to determine if the results of executing the command line conform to one of the languages of the user 304.

If an error was detected (YES branches of operation 344), the validator 276 sends an error report to the client 224 and the server 220, and the adjuster 244 adjusts the criteria 284 and related settings. The error report includes, for example, the executed command line, the received results, the expected results, and the like. The adjuster 244 adjusts the MCLIB criteria 284 and related settings according to the report generated by the validator 276. For instance, if the validator 276 returns an error, such as the term "Total" in the result returned in response to executing the "ls-1" CL was not properly translated into zh_CN.UTF-8 and ru_RU.UTF-8}, then the adjuster 244 adjusts the related components, settings, and configurations. The learner 232 then updates the mapping(s) in the mapping repository 264 based on the adjustments provided by the adjuster 244. In one example embodiment, the adjuster 244 is a rules-based program configured to make adjustments based on the error report and the learner 232 is implemented using an artificial intelligence machine learning system, such as a neural network, and generates new command lines and/or revises existing command lines based on the adjustments produces by the adjuster 244. If an error was not detected during operation 344 (NO branch of operation 344), the method ends 348.

The administrator (admin) 308 is a user with special privileges to configure the MCLIB with related universal settings and criteria (such as UserID, authentication credentials, controlled devices (IP address) and applications, a set of CLs, supported languages, restrictions, and the like), For example, the admin 308 may specify the languages supported by the MCLIB system in the service profile 256. (In addition, a user 304 may specify the languages of the user 304 in the user profiles 260.) The data table 388 is a data structure for tracking and saving MCLIB data (such as the information of the table of FIG. 2).

FIG. 5 is a flowchart 500 for an example Multilingual Command Line Interface Bot (MCLIB), in accordance with an example embodiment. In one example embodiment, speech of a user is monitored (operation 504; this step can be done, for example, using monitor 248). A location of the user and a language of the user are detected (operation 508; this step can be done, for example, using locale detector 236). The monitored speech is converted to a text string in the detected user language (operation 512; this step can be done, for example, using speech-to-text agent 268). The converted text string is parsed into tokens (operation 516; this step can be done, for example, using parser 288). A command line and correlated parameters are recognized based on the parsed tokens (operation 520; this step can be done, for example, using recognizer 240). One or more variables of the environment and attributes are assigned to the recognized command line and the correlated parameters (operation 524; this step can be done, for example, using assigner 272). The recognized command line is deployed and executed with the assigned parameters (operation 528; this step can be done, for example, using deployment agent 252); and the results from executing the recognized command line are validated to verify that the recognized command line is an accurate conversion of the speech (operation 532; this step can be done, for example, using validator 276). In one example embodiment, the operations of the method of FIG. 5 are implemented by a local server, a cloud-based server and the like. In one example embodiment, one or more of the operations of the method of FIG. 5 are implemented on the client-side, for example, by a laptop computer, smartphone and the like.

Different languages/cultures may have different sign languages, poses, gestures and the like which can be identified and converted to a CL. In one example embodiment, a pose, gesture and the like is monitored, the location of the user and the language of the user are detected, the pose/gesture is converted to text and the method proceeds from operation 516 (as described above) to generate the CL. In one example embodiment, the pose/gesture is first converted to a speaking language (such as the speaking language of the user) and the method proceeds as described above using the converted spoken language.

Refer now to FIG. 6.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as multilingual command line interface bot system 200. Details of a non-limiting exemplary embodiment of the multilingual command line interface bot system 200 are described above in conjunction with FIGS. 3A-5. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 6. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

monitoring, using at least one hardware processor, input of a user;

detecting, using the at least one hardware processor, a location of the user and a language of the user;

converting, using the at least one hardware processor, the input to a text string in the detected user language;

parsing, using the at least one hardware processor, the converted text string into parsed tokens;

recognizing, using the at least one hardware processor, a command line and correlated parameters indicated by the input based on the parsed tokens;

executing the recognized command line with the assigned parameters;

verifying, using pre-defined rules, that results of executing the recognized command line validate that the recognized command line is an accurate conversion of the input; and updating mappings of a human command to command line mapping repository based on results of the verifying operation.

2. The method of claim 1, further comprising assigning, using the at least one hardware processor, one or more variables of environment and attributes for the recognized command line and the correlated parameters.

3. The method of claim 1, wherein the assigning operation assigns a language of the user, a date format of the user, and a location of the user.

4. The method of claim 1, wherein the converting the input to the text string further comprises performing speech recognition on the input.

5. The method of claim 1, further comprising:

defining a framework of a Multilingual Command Line Interface Bot for supporting an intelligent voice control command line interface across different languages.

6. The method of claim 1, further comprising:

defining a data structure with related algorithms for tracking user voice commands and related parameters.

7. The method of claim 1, further comprising:

repeating the monitoring, detecting, converting, parsing, recognizing, and executing operations based on additional input, wherein the executing operation further comprises controlling a computer resource based on the additional input.

8. The method of claim 1, further comprising comparing a summary of the parsed text string to entries of the command line mapping repository to identify a most similar command line using an edit distance algorithm.

9. A method comprising:

monitoring, using at least one hardware processor, input of a user;

detecting, using the at least one hardware processor, a location of the user and a language of the user;

converting, using the at least one hardware processor, the input to a text string in the detected user language;

parsing, using the at least one hardware processor, the converted text string into parsed tokens;

recognizing, using the at least one hardware processor, a command line and correlated parameters indicated by the input based on the parsed tokens;

executing the recognized command line with the assigned parameters;

verifying, using pre-defined rules, that results of executing the recognized command line validate that the recognized command line is an accurate conversion of the input;

enabling the user to configure settings and criteria of the method;

learning and generating a human command to command line mapping repository for one or more languages; and adjusting, using a machine-based learner, the settings and criteria based on a result of the validation.

10. The method of claim 9, further comprising:

verifying, using pre-defined rules, that results of executing the recognized command line validate that the recognized command line is an accurate conversion of the input; and revising, using the learner, the recognized command line in the command line mapping repository based on the result of the validation.

11. The method of claim 9, further comprising manually initializing the command line mapping repository with a set of available command lines and updating the mapping repository using machine learning as user input is processed.

12. A computer program product, comprising:

one or more tangible computer-readable storage media and program instructions stored on at least one of the one or more tangible computer-readable storage media, the program instructions executable by a processor, the program instructions comprising:

monitoring, using at least one hardware processor, input of a user;

detecting, using the at least one hardware processor, a location of the user and a language of the user;

converting, using the at least one hardware processor, the input to a text string in the detected user language;

parsing, using the at least one hardware processor, the converted text string into parsed tokens;

recognizing, using the at least one hardware processor, a command line and correlated parameters indicated by the input based on the parsed tokens;

executing the recognized command line with the assigned parameters;

verifying, using pre-defined rules, that results of executing the recognized command line validate that the recognized command line is an accurate conversion of the input; and updating mappings of a human command to command line mapping repository based on results of the verifying operation.

13. A system comprising:

a memory; and at least one processor, coupled to said memory, and operative to perform operations comprising:

monitoring, using at least one hardware processor, input of a user;

detecting, using the at least one hardware processor, a location of the user and a language of the user;

converting, using the at least one hardware processor, the input to a text string in the detected user language;

parsing, using the at least one hardware processor, the converted text string into parsed tokens;

recognizing, using the at least one hardware processor, a command line and correlated parameters indicated by the input based on the parsed tokens;

executing the recognized command line with the assigned parameters;

verifying, using pre-defined rules, that results of executing the recognized command line validate that the recognized command line is an accurate conversion of the input; and updating mappings of a human command to command line mapping repository based on results of the verifying operation.

14. The system of claim 13, the operations further comprising assigning, using the at least one hardware processor, one or more variables of environment and attributes for the recognized command line and the correlated parameters.

15. The system of claim 13, wherein the converting the input to the text string further comprises performing speech recognition on the input.

16. The system of claim 13, the operations further comprising:

enabling the user to configure settings and criteria of the method;

learning and generating the human command to command line mapping repository for one or more languages; and adjusting, using a machine-based learner, the settings and criteria based on a result of the validation.

17. The system of claim 13, the operations further comprising:

defining a framework of a Multilingual Command Line Interface Bot for supporting an intelligent voice control command line interface across different languages.

18. The system of claim 13, the operations further comprising:

repeating the monitoring, detecting, converting, parsing, recognizing, and executing operations based on additional input, wherein the executing operation further comprises controlling a computer resource based on the additional input.

* * * * *